May 28, 1940.  D. TULLOCH  2,202,275
METHOD AND APPARATUS FOR MAKING HELIXES WITHOUT
THE AID OF A CORE OR MANDREL
Filed Feb. 7, 1939  5 Sheets-Sheet 1
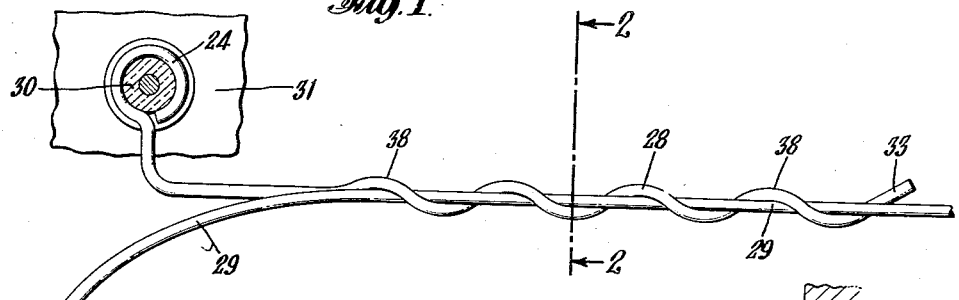
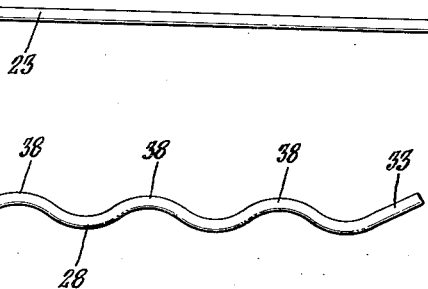
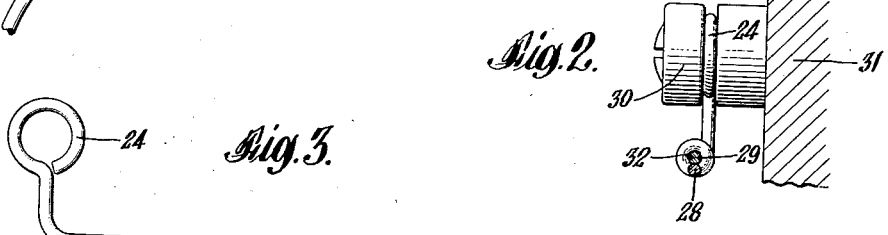
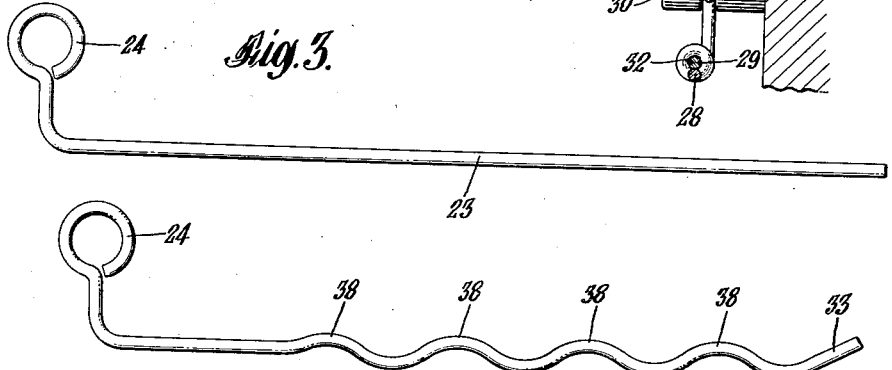
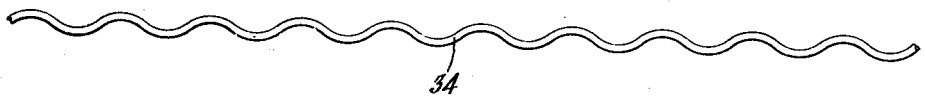
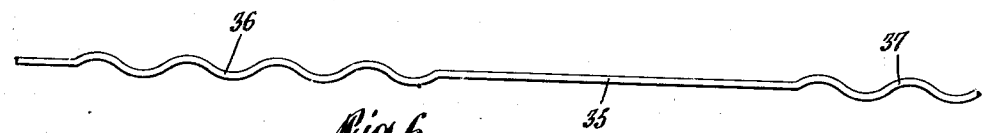
INVENTOR
David Tulloch.
BY
ATTORNEY

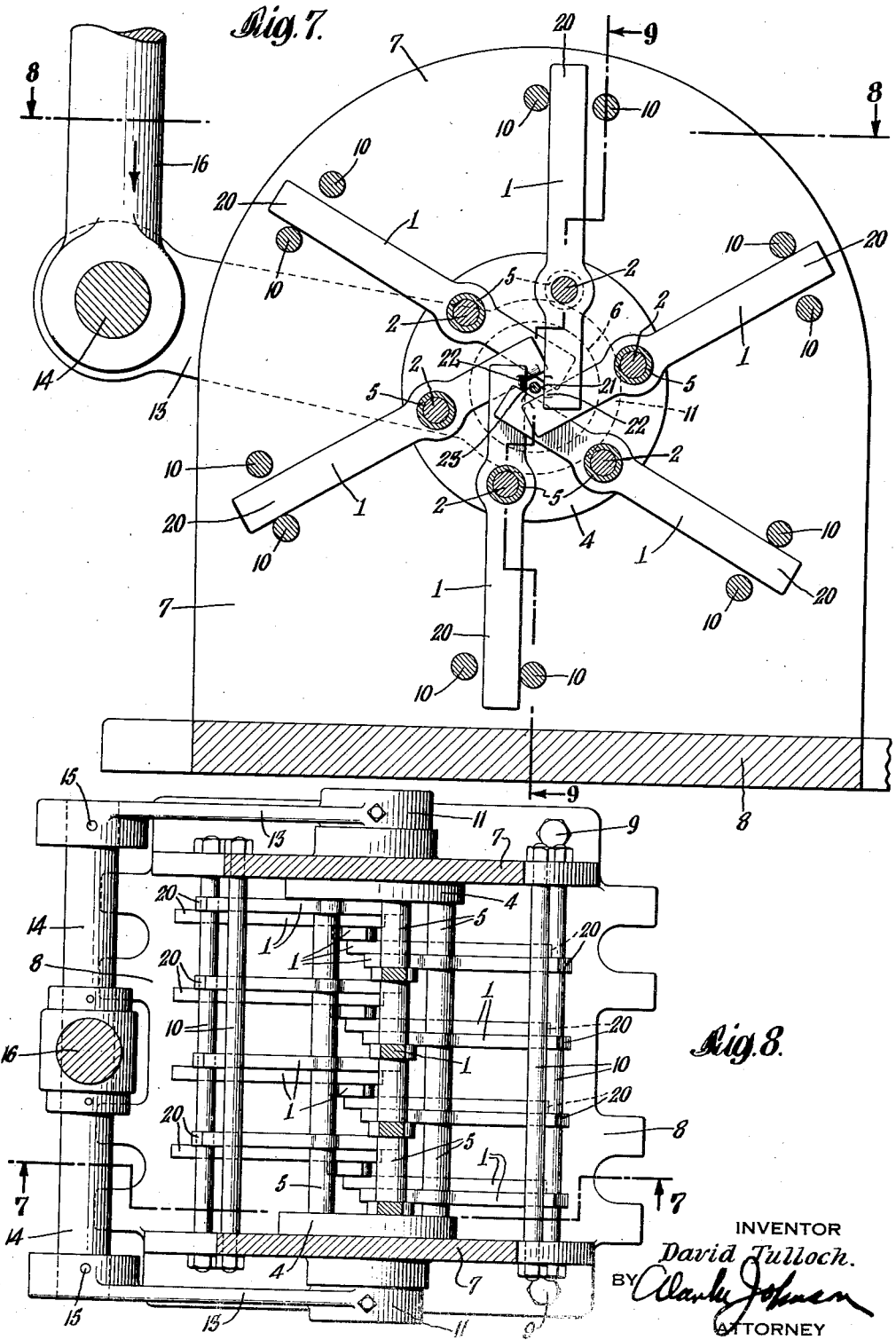

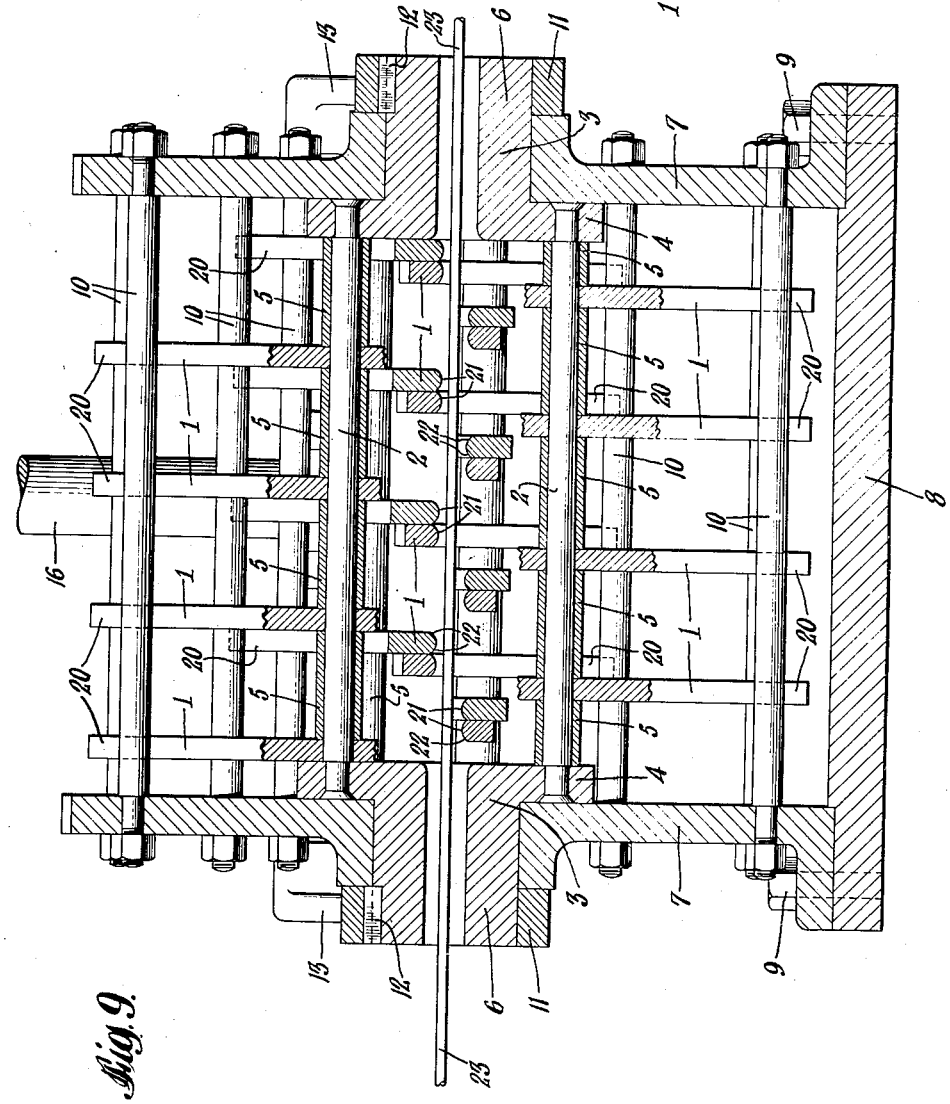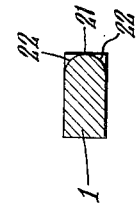

INVENTOR
David Tulloch.
BY
ATTORNEY

Patented May 28, 1940

2,202,275

UNITED STATES PATENT OFFICE 2,202,275

METHOD AND APPARATUS FOR MAKING HELIXES WITHOUT THE AID OF A CORE OR MANDREL

David Tulloch, Garwood, N. J., assignor to Diamond Expansion Bolt Company, Garwood, N. J., a corporation of New Jersey Application February 7, 1939, Serial No. 255,007

16 Claims. (Cl. 140—71)

More particularly my invention covers the method and apparatus for making helixes cheaply and expeditiously. These helixes may be used for various purposes. They are particularly adapted to support and hold objects on a wall, pole or any other support.

I have shown helixes made by my invention, supporting a power wire, or line wire, though of course the helixes are adapted for various other uses.

Helixes have heretofore been made by employing a cylindrical core or mandrel around which the wire was wound, the core or mandrel being then removed. This method is slow and expensive It is not economically feasible to use helixes in large quantities manufactured by the old method above described. By my invention the cost of manufacture is so reduced that they can be used in large quantities to support line wires, power wires, or similar members, from walls, poles, or other supports.

My invention further relates to certain combinations, sub-combinations, methods and details of construction, all of which will be more fully hereinafter described and pointed out in the claims.

For purposes of illustration I have shown different forms of helixes, made by my invention, supporting a power wire, or a telephone line wire, from a wall or other support.

In the figures I have shown one embodiment of my invention, the same reference numerals refer to similar parts of the several figures.

Fig. 1 is a front elevation of a wall or other support on which I have shown one form of helix made by my invention employed to support a power or line wire, the insulator being shown in section.

Fig. 2 is a transverse vertical section on the line 2—2 of Fig. 1, looking in the direction of arrows.

Fig. 3 is a plan view of a wire blank from which one form of helix is made by my invention.

Fig. 4 is one form of helix made from the wire blank of Fig. 3.

Fig. 5 is another form of helix made by my invention.

Fig. 6 is another form of helix made by my invention.

Fig. 7 is a vertical section on lines 7—7 of Fig. 8, with the wire ready to be operated upon by the pivoted dies.

Fig. 8 is a horizontal section on line 8—8 of Fig. 7.

Fig. 9 is a vertical section on line 9—9 of Fig. 7, looking in the direction of the arrows, before the dies act upon the wire to form the helix.

Fig. 10 is a plan view of one of the pivoted dies 1, provided with a cut away or eased off die surface 22, to avoid indenting or marring the wire of the helix.

Fig. 11 is a cross section on line 11—11 of Fig. 10, looking in the direction of the arrows.

By my invention I subject wire, or similar material, to pressure at different angles to the longitudinal axis of the wire, to form one or more helixes as may be desired in the finished article. Preferably they are formed at one operation, or they may be formed successively.

I have illustrated, by way of example, one form of apparatus but my invention is not to be limited to this particular form.

Figure 12:
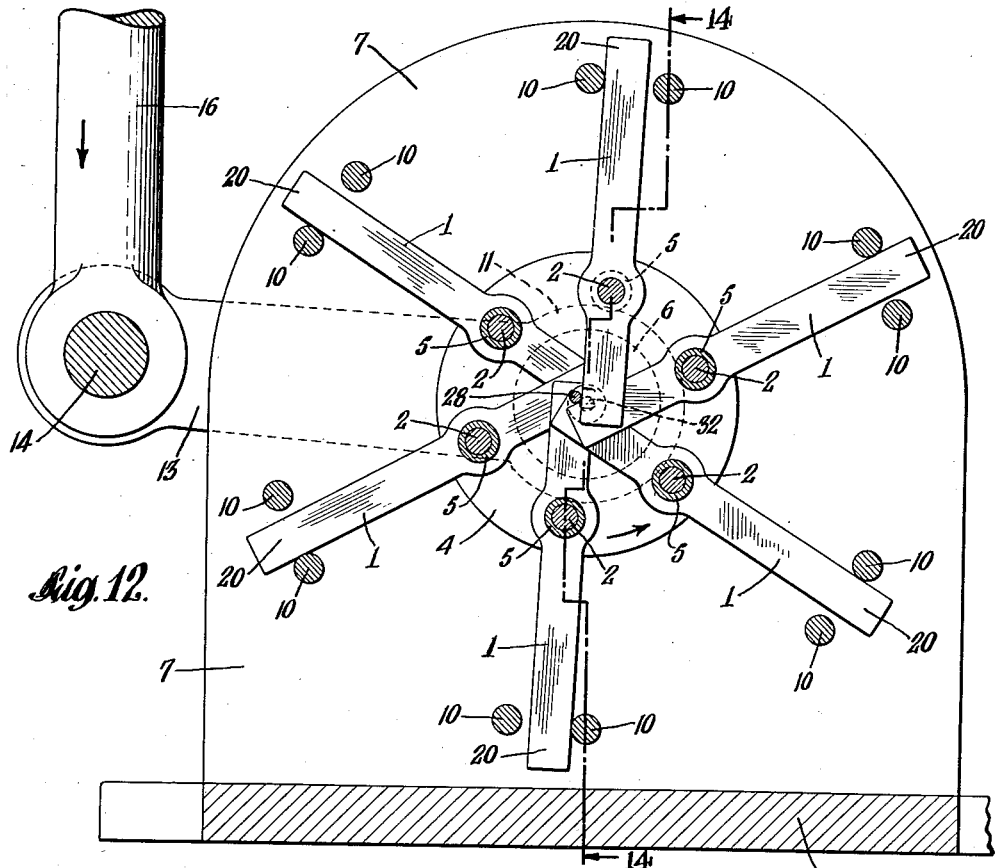
Fig. 12 is a section, similar to Fig. 7, after the pivoted dies have formed the helix 28.

In this example of my invention, I use a plurality of pivoted dies 1, 1 pivoted on the pivot rods 2, 2 mounted on the movable or rocking members 3, 3. These movable members 3, 3 pivoting rods 2, 2 and pivoted dies 1, 1, form a movable member or cage 4, Figs. 9, 12 and 13. The pivoting dies 1, 1 are separated from each other by the cylindrical spacers 5, 5, Fig. 9.

The cage 4 has trunnions 6, 6 mounted to have a limited rotation or rocking movement in the fixed side plates 7, 7 which are fast and immovably held on the bed plate 8 by the bolts 9, 9. The immovable side plates 7, 7 are held together by transverse rods 10, 10 which act as stops to control the movement of the arms 20, 20 of the movable dies 1, 1, see Figs. 7, 8, 9, 12 and 13.

Connected immovably by the keys 12, 12, Fig. 9, to the trunnions 6, 6 of the movable or rocking member or cage 4 is a yoke 11, Fig. 8, formed by the side members 13, 13 and the cross-bar 14, the latter being held immovably to the side members 13, 13 by the pins 15, 15, Fig. 8. Rotatably mounted on the cross bar 14 is the actuating arm or link 16, adapted to have a limited vertical reciprocation. This arm may be reciprocated by any suitable means, as for example, the movable part of a power press, not shown.

In the particular form of apparatus shown by way of example the transverse rods or stops 10, 10 are mounted in pairs, each pair controlling the throw or pivoted movement of one pivoted die 1. This is accomplished by mounting one free arm 20 of a die 1 between each pair of stops 10, 10, the arrangement being such that the distance between each pair of stops 10, 10 is greater than the thickness of the free arm 20 mounted between them. This permits a limited free pivoting of the dies 1, 1.

The die or shaping surface 21 of each die 1, is cut away or eased off at 22, 22, Figs. 9, 10 and 11, to avoid indenting or marring the surface of the wire from which the helixes are made.

In the operation of this form of my invention, a straight wire blank 23, Fig. 3, with or without an eye 24, is fed to my machine, the die or shaping surfaces 21, 21 being then in their retracted position, Figs. 7 and 9.

Power is then applied to the arm or link 16 in the direction of the arrow shown in Fig. 7. This causes the yoke formed of the side arms 13, 13 and the cross rod 14 to partially rotate the trunnions 6, 6 of the movable cage 4, with its pivoted dies 1, 1. This limited rotary movement is free until the ends 20, 20 of the dies 1, 1 contact with one of each pair of stops 10, 10, as shown in Fig. 7. One of each pair of stops 10 will then hold its arm 20 from further rotary movement, because these stops 10, 10 are mounted on the immovable side plates 7, 7, see Figs. 7 and 9. But this does not prevent a further slight rotation of the movable member 4 with its pivot rods 2, 2 carrying the pivoted dies 1, 1. With the ends 20 of the pivoted dies 1 stopped from further rotary movement by one of each pair of stops 10, 10, and the movable member or cage 4 continuing to rotate slightly, due to the fact that the dies 1, 1 are pivoted on the pivots 2, 2 on the movable member or cage 4, a powerful leverage is obtained, permitting the die shaping surfaces 21, 21 to easily bend a wire, or other material, into any desired helix, as for example, the helix 28 of Fig. 4.

This helix 28 may be used for various purposes, as for example supporting a power wire 29 on an insulator 30, mounted on a wall 31. This helix 28 has a longitudinal bore 32, Figs. 2 and 13, the walls of which are interrupted by the open surfaces between the convolutions of the helixes.

Such a helix may be readily applied by a lineman, or other operator, grasping the end 33, Fig. 4, and winding it around the power or other wire 29, which it will strongly grip and hold, forming an excellent support for the wire and taking the strains and stresses from it and transferring them to the wall or other support 31, thereby materially lessening the danger of a sleet or wind storm causing the line to fail.

Any suitable form of helix desired may be made by my invention. For example, the entire wire blank may form a single helix 34, Fig. 5. Or, one end of the wire, Fig. 6, may be formed into a helix 36, and the other end of the wire into a different length of helix 37, with an intermediate straight portion 35.

The number of pivoted dies 1, 1 may be varied. I preferably employ six similar dies 1, 1 for each turn 38, 38, Fig. 4. This number may be increased or diminished, as desired. In the helix shown in Fig. 4 there are four turns 38, 38. Therefore, in this form I preferably use 24 dies 1, to make this helix shown in Fig. 4, at one operation of the power member 16. By feeding the wire through the machine, step by step or successively, the helix of Fig. 5 can be formed; and also the helix of Fig. 6 in which only half the number of dies 1 would be used to make the helix 37.

Figure 13:
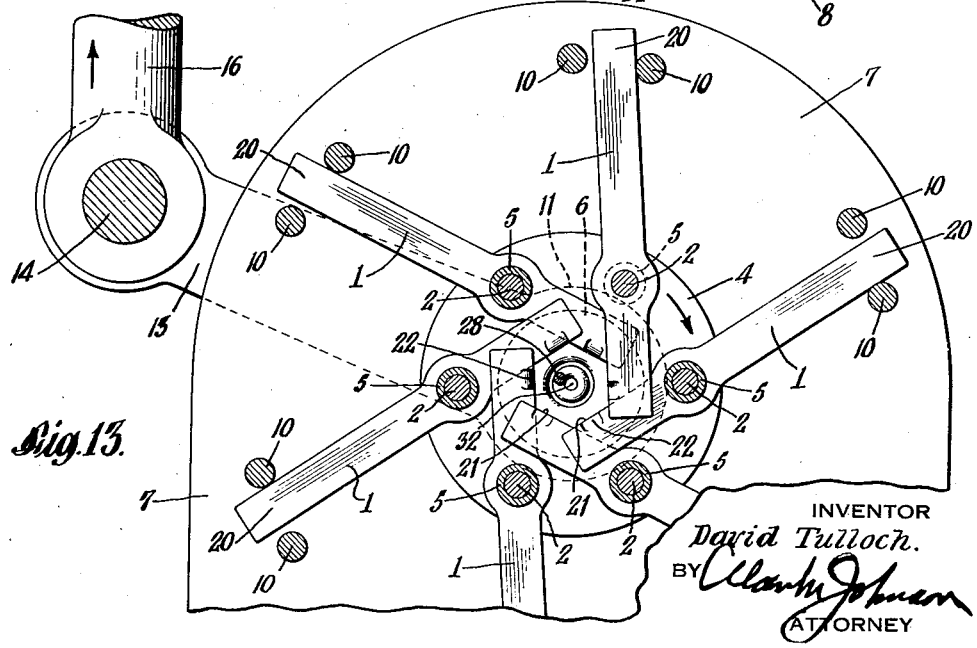
Fig. 13 is a section, similar to Fig. 12, with the pivoted dies withdrawn into their inoperative position, to permit the withdrawal of the helix 28.
Figure 14:
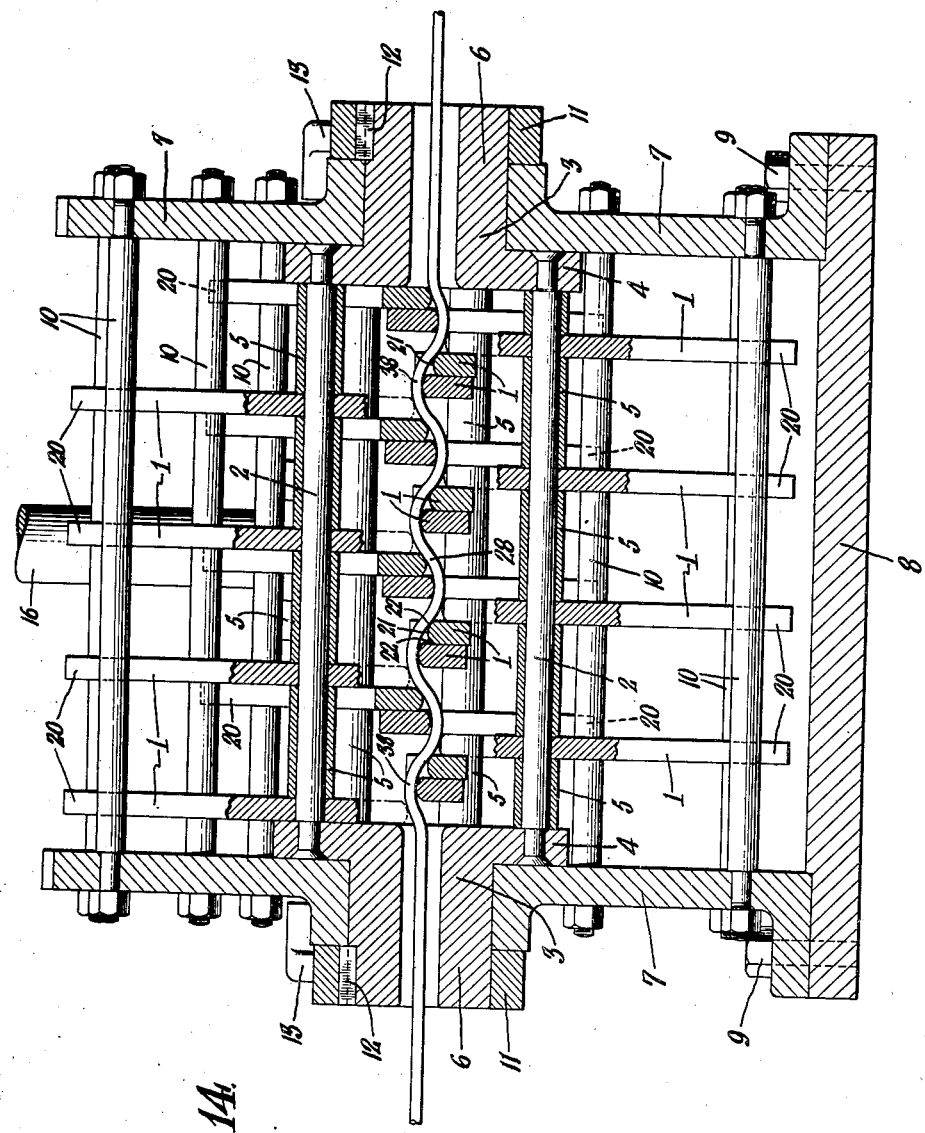
Fig. 14 is a vertical section on line 14—14 of Fig. 12, showing the position of the pivoted dies after forming the helix.

After the helix has been formed the die or shaping surfaces 21, 21 are withdrawn from the helix by reversing the stroke of the power arm 16, as indicated by the arrow in Fig. 13. In this withdrawing movement the ends 20, 20 of the die arms contact with the opposite stops 10 of each pair of stops 10, 10, Fig. 13. It will be seen that definite lengths of wire can be formed into helixes with unformed portions of wire on either side of said helixes, as well as formed into, continuous helixes, Fig. 5, as previously noted.

In shaping the helixes, it is well to over bend them so as to allow for the elastic property of the wire, which will cause it to spring back into a helix of the desired shape.

More than one diameter of wire can be shaped, and more than one diameter of helix can be formed in the same machine by regulating the amplitude of movement of the power arm 16.

It will be noted that no mandrel or core is employed, and that the helixes can be manufactured as fast as an operator can feed the blanks to the dies. This so reduces the cost of manufacture that my helixes can be used in quantities, and can successfully and economically compete with inferior fasteners used for the same purpose.

Having thus described this invention in connection with illustrative embodiments thereof, to the details of which I do not desire to be limited, what is claimed as new and what is desired to secure by Letters Patent is set forth in the appended claims.

What I claim is:

1. In an apparatus for forming helixes from wire or similar material, without the aid of a core or mandrel, consisting of a fixed member, a movable member, stops on the fixed member, a plurality of pivoted dies carried by the movable member having portions adapted to cooperate with the stops carried by the fixed member, and means to move the movable member to form helixes from the wire or similar material.

2. In an apparatus for forming helixes from wire or similar material, without the aid of a core or mandrel, consisting of a fixed member, a rocking member, stops on the fixed member, a plurality of pivoted dies carried by the rocking member, having portions adapted to cooperate with the stops carried by the fixed member, and means to rock the rocking member to form helixes from the wire or similar material.

3. The method of forming a supporting helix from wire or similar material, without the aid of a core or mandrel, consisting in simultaneously subjecting the wire at various points around its periphery to dies, moveable in different arcs of different circles, said arcs passing through the longitudinal axis of the wire blank, while the portion of the wire directly opposite to the portion being bent is free, to form a helix, having a longitudinal bore adapted to receive and grip the object to be supported by the helix.

4. In an apparatus of the class described, an outer cage and an inner cage, either cage being fixed and the other moveable, either cage having fixed stops to actuate pivoted dies mounted on the other cage, such dies providing bending means operating as the moveable cage rotates, to form a wire lying in or near the central axis of the inner cage into a helical shape.

5. In an apparatus of the class described, an outer cage and an inner cage, either cage being fixed and the other moveable, either cage having fixed stops to actuate pivoted dies mounted on the other cage, such dies providing bending means operating as the moveable cage rotates, to form a wire lying in or near the central axis of the inner cage into a helical shape, each of the dies pressing against a portion of the periphery of the wire with no opposing die or forming object directly opposite such portion.

6. The method of forming a supporting helix from wire or similar material, without the aid of a core or mandrel, consisting in simultaneously bending a substantially straight wire along its length between a plurality of movable dies, moving in arcs of different circles, to form a helix having a bore of substantially uniform diameter to support, grip and hold a wire or other object mounted within it.

7. The method of forming a supporting helix from wire or similar material, without the aid of a core or mandrel, consisting in simultaneously bending a substantially straight wire along its length between a plurality of movable dies, moving in arcs of different circles, each die having a helically curved shaping surface to form a helix, having a bore of substantially uniform diameter, to support, grip, and hold a wire or other object mounted within it.

8. The method of forming a supporting helix from wire or similar material, without the aid of a core or mandrel, consisting in simultaneously bending a substantially straight wire along its length between a plurality of pivoted dies to form a helix having a bore of substantially uniform diameter and an interrupted exterior surface, the interruptions being due to the convolutions of the helix, to support, grip and hold a wire or other object mounted within it.

9. The method of forming a supporting helix from wire or similar material, without the aid of a core or mandrel, consisting in simultaneously bending a substantially straight wire along its length between a plurality of movable dies, each die having helically curved shaping surfaces, and increasing the force to actuate the movable dies, so that a lesser actuating force applied to the movable dies will develop a greater and necessary force to actuate the die surfaces to bend the wire and form a helix having a bore of substantially uniform diameter to support, grip and hold a wire, or other object, mounted within it.

10. The method of forming a supporting helix from wire or similar material, without the aid of a core or mandrel, consisting in simultaneously bending a substantially straight wire along its length between a plurality of pivoted dies moving in arcs of different circles, each die having a helically curved shaping surface, and applying force to the pivoted dies so that said force will be augmented or increased to that necessary to actuate the dies and insure that the dies bend the wire into a helix having a bore of substantially uniform diameter, and an interrupted exterior due to the convolutions of the helix, to support, grip and hold a wire, or other object, mounted within it.

11. An apparatus for forming supporting helixes from wire or similar material without the aid of a core or mandrel, comprising a plurality of movable dies, each movable die being provided with shaping surfaces, comprising a portion of a helix to bend a substantially straight wire blank in one operation in a plurality of planes, to form a helix having an axial bore of substantially uniform diameter and an interrupted exterior due to the convolutions of the helix.

12. An apparatus for forming supporting helixes from wire or similar material without the aid of a core or mandrel, comprising a plurality of pivoted dies; each pivoted die being provided with shaping surfaces comprising a portion of a helix to bend a substantially straight wire blank in one operation in a plurality of planes to form a helix having an axial bore of substantially uniform diameter and an interrupted exterior, due to the convolutions of the helix.

13. An apparatus for forming supporting helixes from wire or similar material without the aid of a core or mandrel comprising a plurality of movable dies, each movable die being provided with shaping surfaces, comprising a portion of a helix to bend a substantially straight wire blank in one operation in a plurality of planes, to form a helix having an axial bore of substantially uniform diameter and an interrupted exterior due to the convolutions of the helix, and means to increase the bending force of the dies.

14. An apparatus for forming supporting helixes from wire or similar material without the aid of a core or mandrel comprising a plurality of pivoted dies; each pivoted die being provided with shaping surfaces comprising a portion of a helix to bend a substantially straight wire blank in one operation in a plurality of planes to form a helix having an axial bore of substantially uniform diameter and an interrupted exterior due to the convolutions of the helix, and means to increase the bending force of the pivoted dies.

15. The method of forming a helix as a separate article of manufacture, from wire or similar material, without the aid of a core or mandrel, consisting in subjecting the wire simultaneously at various successive portions around its periphery, each successive portion being progressively further along the wire than the preceding one, to pressure by dies located adjacent to the said portions movable from the periphery of the wire towards and across its original center while the portion of the wire directly opposite to the portion being bent is free, to form a helix; the entire operation not requiring any substantial motion of the wire as a whole along the axis of the helix.

16. An apparatus for forming helixes from wire or similar material without the aid of a core or mandrel, consisting of a plurality of movable dies mounted adjacent to points located successively around the periphery and progressively along the length of a wire blank and mechanical means to simultaneously move them towards and across the longitudinal axis of the wire blank to form a helix, without the aid of directly opposed dies, and not requiring any substantial longitudinal motion of the wire as a whole along the axis of the helix.

DAVID TULLOCH.